United States Patent [19]
Hausler

[11] 4,011,753
[45] Mar. 15, 1977

[54] METHOD AND DEVICE FOR MEASURING THE FLOW VELOCITY OF MEDIA BY MEANS OF ULTRASOUND

[75] Inventor: Eberhard Hausler, Saarbrucken, Germany

[73] Assignee: Dragerwerk Aktiengesellschaft, Germany

[22] Filed: June 26, 1975

[21] Appl. No.: 590,631

[30] Foreign Application Priority Data

June 29, 1974 Germany ............................ 2431346

[52] U.S. Cl. ............................................. 73/194 A
[51] Int. Cl.² ............................................ G01F 1/66
[58] Field of Search ................................. 73/194 A

[56] References Cited

UNITED STATES PATENTS

| | | | |
|---|---|---|---|
| 3,237,453 | 3/1966 | Yamamoto et al. | 73/194 A |
| 3,282,101 | 11/1966 | Yamamoto | 73/194 A |
| 3,738,169 | 6/1973 | Courty | 73/194 A |

*Primary Examiner*—Charles A. Ruehl
*Attorney, Agent, or Firm*—McGlew and Tuttle

[57] ABSTRACT

Ultrasonic waves, produced from electric signals at one end of a measuring section having the length s, are transmitted through the measuring section and retransformed into electric signals at the opposite end of the measuring section. The transit time $T_1$ of the ultrasound in the flow direction of the media, and the transit time $T_2$ of the ultrasound in the opposite direction, are determined, digitized, inverted into their respective reciprocal values $1/T_1$ and $1/T_2$ to establish the difference $1/T_1 - 1/T_2$ whereby the flow velocity $v = s/2\,(1/T_1 - 1/T_2)$ may be determined. The device includes a rectilinear conduit section through which the media flows and preferably made of a glass ceramic material having a zero temperature coefficient. Ultrasonic transducers are located at the opposite ends of the measuring section and have concave surfaces which face each other and are located in mutual confocal relation. The ultrasonic transducers may operate alternately as emitters and receivers, or two ultrasonic transducers can be provided at each end of the measuring section, one being an emitter and the other being a receiver.

11 Claims, 3 Drawing Figures

METHOD AND DEVICE FOR MEASURING THE FLOW VELOCITY OF MEDIA BY MEANS OF ULTRASOUND

FIELD AND BACKGROUND OF THE INVENTION

The present invention relates to a method of measuring the flow velocity of media in conduits by means of ultrasound, the ultrasonic waves being produced at one end of the measuring section by electric signals, transmitted through the measuring section and reconverted into electric signals at the other end. The invention further relates to a device for carrying out the method.

The well known idea, on which ultrasonic flow meters are based, is to send ultrasonic pulses through the flowing fluid, first in the flow direction and then in the opposite direction. Thereupon, the transit times of the two pulses are compared with each other.

As is known, the velocity of the ultrasonic pulses in the flow direction is higher and in the opposite direction lower than the sound velocity. The also known quantitative relation between the flow velocity $v$ of the medium and the sound velocity $c$ is given by the equation $$c = c_o \pm v,$$

where $c_o$ is the sound velocity in the medium at rest. By measuring the difference of transit times in the two directions of sound propagation, it is possible to determine the flow velocity $v$ of the medium. To effect this, either a time-difference or a frequency-difference method may be used.

In the time-difference method, the relation $$T_1 = \frac{s}{c_o + v}$$

is applicable for the sound transit time in the flow direction along a sound path with the length s and the relation $$T_2 = \frac{s}{c_o - v}$$

is applicable for the transit time against the flow. Assuming that, in many practical cases, the flow velocity will be substantially lower than the sound velocity $c_o$, the approximation equation is $$T_2 - T_1 \approx \frac{2 \cdot s \cdot v}{c_o^2}$$

The advantage of the time-difference method is a rapid response and the possibility, with a reversing switch, of using only one emitter and one receiver. It is disadvantageous, however, that small time differences must be measured and, in addition, that the result depends on the sound velocity in the medium. Thus, for determining the result, the sound velocity $c_o$ at the instant of measurement must be known.

For the frequency-difference method, two emitter-receiver couples are necessary in normal cases. In each couple, the pulse received at one end of the two transmission paths is used for releasing the next emitted pulse so that a pulse train is produced in each of the transmission paths. The period of this pulse train comprises the transit time. This circulation principle is known under the designation of "sing-around-method." The frequencies of recurrence are, for a pulse train in the downstream direction, $$f_1 = \frac{c_o + v}{s}$$

and, for a pulse train in the upstream direction, $$f_2 = \frac{c_o - v}{s};$$

wherefrom, the frequency difference is $$f_1 - f_2 = \frac{2v}{s}.$$

Thus, the frequency difference is proportional to the flow velocity of the medium, and independent of the sound velocity $c_o$. The advantage of this method is an easily measurable quantity which is independent of the sound velocity. However, because of the long counting interval due to the multiple cycle, the response time is relatively long. In addition, two emitter-receiver couples are needed.

There is a known ultrasonic flowmeter in which sound pulses are transmitted either between two emitter-receiver units in both directions or between single emitters and receivers, respectively, also in both directions. As in the frequency-difference method, pulses are released in the circulating manner. The cycle terminates after a predetermined number of transmissions in either direction has been completed. The time difference between the respective received pulses in both transmission paths is measured. The time difference is increased by a factor corresponding to the number of recurrences. Such an increased time difference can be more easily measured with the desired accuracy. For this purpose, the time differences in the pulse trains are summed up. The disadvantage of this device is its dependence on the sound velocity in the medium at rest. Therefore, a possibility of correction must be provided (German Patent No. 2,110,582).

Another known flow meter determines the flow velocity of a fluid from the transit time of sound waves travelling through the fluid along three paths, namely along a path extending obliquely upward, against the flow direction, a path extending obliquely downward in the flow direction, and a path extending obliquely downward in the flow direction, and a diametral path extending along a diameter of the pipe. Only one oblique path may also be provided. The transducers provided at the ends of this path are simultaneously excited by an electric signal having a duration shorter than the transit time of the sound waves, so that the two transducers can be operated both as emitters and receivers. The transit time difference of the signals is proportional to the flow velocity and to the cosine of the angle formed between the sound path and the flow direction.

Since this is a time-difference method, the measurement depends on the sound velocity, and the sound velocity at the instant of measuring is to be taken into account. This is done by a clock operating on the basis of a circuit loop in which the third sound path extending perpendicularly to the flow direction is connected. The operation of the clock is controlled as a function of the square of the sound velocity in the fluid (German Pat. No. 2,107,586).

A further known ultrasonic flow meter is based on the Doppler-frequency shift of a movable reflector. Sound waves are sent in the direction of foreign particles, such as dust particles, suspended particles, or the like, contained in the fluid to be measured. The foreign particles reflecting the ultrasonic waves have an acoustic impedance different from that of the fluid. The reflected sound waves are picked up by a receiver and the determined Doppler shift is used for determining the flow velocity of the fluid. To narrow the control range of the sound waves, devices, such as lenses, are provided in advance of the ultrasonic emitter or receiver, having to focus the ultrasonic waves.

The measuring is effected by means of an ultrasonic signal sent out by the emitter and having a frequency $f_o$. The sound waves are reflected from the foreign particles in the fluid stream and picked up by the emitter at a frequency $f_r$. The Doppler frequency $$f_d = f_o - f_r$$

is proportional to the velocity of the foreign particles and, consequently, to the velocity of the carrier fluid. The output signal representing $f_d$ can be indicated in an analog form or also in a digital form.

The disadvantage of this measuring method is the expensive equipment needed for the beaming of the sound waves as well as for the elimination of the temperature influence, which measures are necessary for accurate measurement, and the presence in the fluid of the particles necessary for the reflection of the sound waves (German Pat. No. 2,130,999).

Another known ultrasonic device for acoustic and flow measurements in fluids uses special modulation means for measuring the transit time of sound waves along at least one path extending through the fluid. The signal generator emits an oscillation which is frequency-modulated in accordance with an exactly predetermined principle and has a constant duration T. The difference of the transit times during the travel upwardly and downwardly is measured. The output signal representing this difference is measured by means of a timing frequency which is corrected as a function of the sound velocity in the fluid. The main drawback of this measuring device is the great bandwidth of the acoustoelectric transducers necessary for the method (German Pat. No. 2,109,222).

SUMMARY OF THE INVENTION

The present invention is directed to a method and device for measuring the flow velocity of media in conduits by means of ultrasound, in which the advantage of the high time resolution inherent in the transit time method is combined with the advantage of the frequency-difference method, namely, the independence of the velocity measurement of the sound velocity in the flowing medium.

In accordance with the invention, the flow velocity is measured so that the transit time $T_1$ of the ultrasound in the flow direction and the transit time $T_2$ in the opposite direction are determined, digitized, inverted into their reciprocal values, and the difference $1/T_1 - 1/T_2$ is formed resulting in the determination of the flow velocity $$v = \frac{s}{2}(1/T_1 - 1/T_2).$$

The advantages obtained with this method are to be seen primarily in that, after measuring the transit times and digitizing the time values as well as after their inversion, the evaluation can be made in accordance with the frequency-difference method. The difference of the reciprocal values of the transit times in the flow direction $T_1$ and the opposite direction $T_2$ of the ultrasonic pulses, being equal to $(2v/s)$, results in the determination of the flow velocity $v$ of the medium in the conduit. Like the frequency-difference method, this measuring method is independent of the sound velocity in the flowing medium, which is strongly determined by the state of the medium. In consequence, no additional corrections are necessary.

An embodiment of the invention for carrying out the method provides one ultrasonic transducer at each of the two ends of a measuring section, each of the transducers operating alternately as emitter or receiver. Signals produced in a first signal generator pass through an output gate which is placed, for a predetermined period of time, into open state by a master clock through a monostable flip-flop. In the first ultrasonic transducer operating as emitter, the signals are transformed into ultrasonic pulses which travel through the measuring section and are re-transformed in the second ultrasonic transducer operating as receiver, into electrical signals. These signals close an input gate, which has previously been opened by the master clock, to stop pulses passing therethrough from a second signal generator. The impulses delivered by the second signal generator are digitized in a following counter, inverted in a reciprocal counter and supplied to a first storage. In a similar manner, the signals of the first signal generator are directed, by reversing an intermediate switch, to the second ultrasonic transducer operating this time as emitter, are transformed, transmitted, and re-transformed and determine a second train of pulses furnished by the second signal generator and channeled, through a two-position switch, as reciprocal values into a second storage. In a subtraction stage following the two storages, the reciprocal values are subtracted for determining the flow velocity of the medium.

In an advantageously simple manner, the inventive device determines the transit time by determining the number of pulses which have been delivered to the counter from the second signal generator within the period of time between the opening of the input gate, taking place simultaneously with the opening of the output gate, and the closing of the input gate effected by the arrival of the signals coming from the measuring section and produced by conversion of the ultrasonic pulses. This transit time is inverted, by means of a rapid arithmetic unit, into its reciprocal value and stored in a first storage. For measuring the transit time in the counterflow direction, the connection of the ultrasonic transducers is reversed, by means of an intermediate switch, the value of the transit time is determined again and stored in the second storage. No particular difficulties are involved in the forming of the difference for determining the flow velocity. The component parts necessary to this end are of mature design and relatively inexpensive.

According to another embodiment of the inventive device, two ultrasonic transducers operating as emitter and receiver, respectively, are provided at each end of the measuring section. Signals of a first signal generator are delivered through an output gate controlled by a master clock through a monostable flip-flop, and transformed into ultrasonic pulses in the emitters. Upon passing through the measuring section, the ultrasonic pulses are retransformed into electric signals in the receivers and close the input gates, which have previously been opened by the master clock, thereby stopping the passage of signals delivered by a second signal generator. The already passed signals are digitized in following counters, and the values are inverted and entered in storages wherefrom the differences are formed in a subtraction stage to determine the flow velocity of the medium.

This embodiment differs from the first embodiment in that two ultrasonic transducers, namely, an emitter and a receiver, are provided at each end of the measuring section, upstream and downstream. The intermediate and the two-position switch can therefore be omitted. The input gates, counters and reciprocal units are doubled. It may be advantageous, for example, if the conditions in the media to be measured vary very rapidly, to make the measurement in both directions simultaneously. In such a case, a device in accordance with the second embodiment will be selected.

In a development of the invention, the emitters may be concave ring-shaped transducers and the receivers point transducers located at the focal point and, in accordance with a further development, the receivers may also be ring-shaped transducers. Such a design is advantageous for the measurement since then, the flow direction of the medium largely coincides with the direction of the sound.

An object of the invention is to provide an improved method for measuring the flow velocity of media in conduits by means of ultrasound.

Another object of the invention is to provide an improved device for measuring the flow velocity in conduits by means of ultrasound.

A further object of the invention is to provide such a method and device in which the advantage of a high time resolution, inherent in the transit time method, is combined with the advantage of the frequency-difference method, particularly the independence of the velocity measurement of the sound velocity in the flowing medium.

For an understanding of the principles of the invention, reference is made to the following description of typical embodiments thereof as illustrated in the accompanying drawings.

Figure 1:
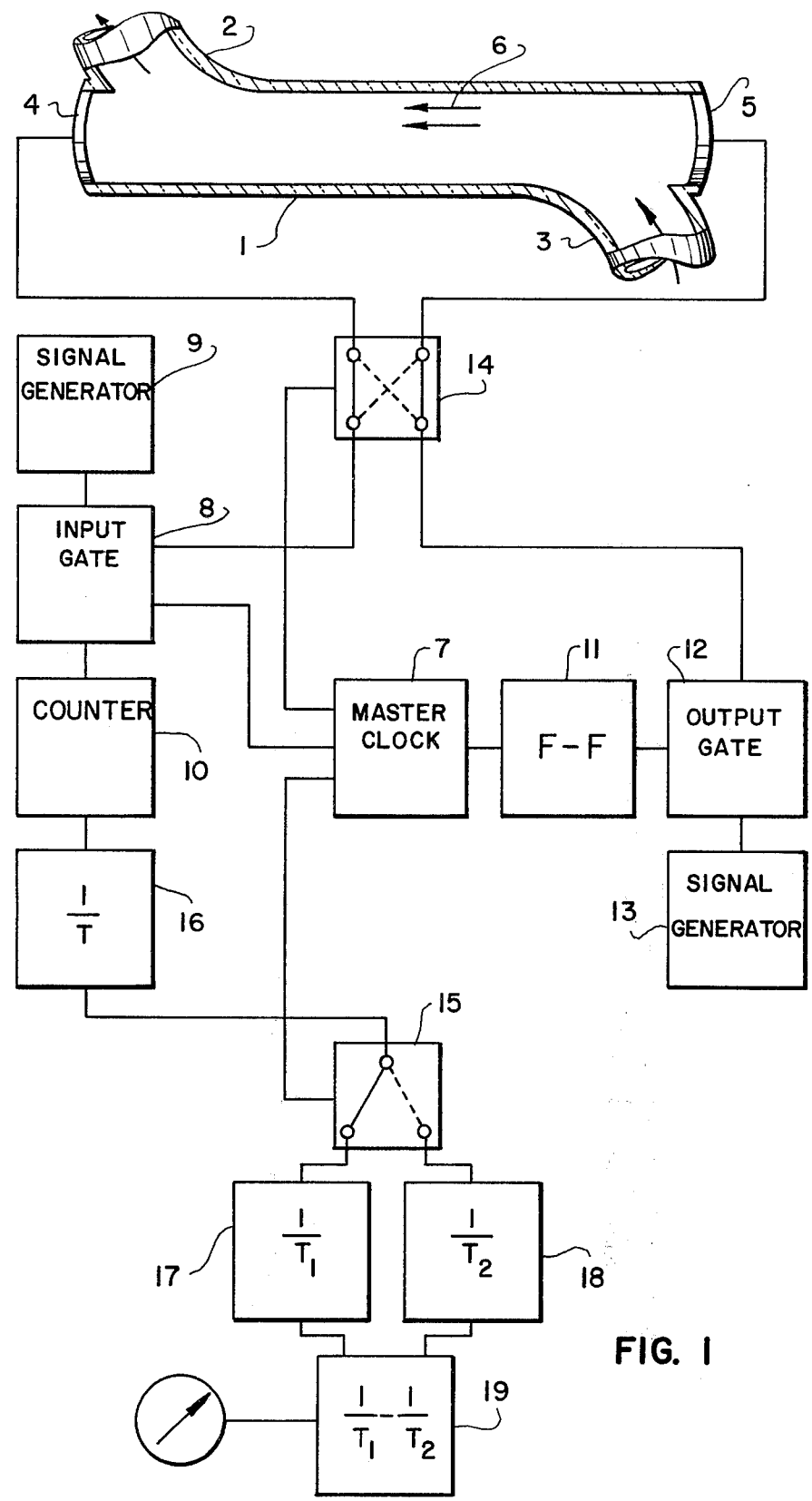
FIG. 1 is a block diagram illustration of an arrangement for measuring flow velocities using two transducers acting alternately as emitters and receivers and associated with reversing switches.

In the Figures, there are shown the basic elements which are necessary for the operation of the measuring arrangement according to its purpose.

The measuring section 1 forms a part of a piping or conduit through which the medium to be measured is directed either fully or as a branched portion. Measuring section 1 is a straight section of the line which is inserted in the piping by means of bends 2 and 3 which have identical dimensions and are connected laterally to the respective opposite end portions of the measuring section. This design results in a flow pattern which is as homogeneous as possible (stream lines of equal length). Measuring section 1 preferably is made of a glass ceramic material having a zero temperature coefficient. At each of the opposite ends of measuring section 1, a respective ultrasonic transducer 4 or 5 is mounted, each transducer having a concave surface. The two transducers are in confocal positions to improve the signal-to-noise ratio. In the measuring section, the medium 6 flows in the direction indicated by arrows.

Ultrasonic transducers 4 and 5 are spaced from each other by the length of the axial sound path representing the measuring section. They can be connected both as electroacoustic transducers and as acoustoelectric transducers.

In accordance with FIG. 1, the flow velocity of medium 6 is measured in two consecutive phases, by means of ultrasound signals, first in the flow direction of the medium and then in the opposite direction. In the provided intermediate switch 14 and two-position switch 15, the solid lines indicate the connections in the first phase and the broken lines indicate the connections in the second phase.

The first phase begins with a pulse of a master clock 7 applied to an input gate 8. This pulse opens input gate 8 whereupon pulses of a signal generator 9 pass into a counter 10. Simultaneously with the opening of gate 8, master clock 7 triggers a monostable flip-flop 11 which enables an output gate 12 for a certain period of time. This period is slightly longer than the sound propagation time in the medium 6. Through open output gate 12, signals of a signal generator 13 are delivered to ultrasonic transducer 5 where they are transformed into ultrasonic waves and emitted. The waves pass through medium 6 to ultrasonic transducer 4 where they are received, retransformed into electric signals and delivered to input gate 8 which is thereby placed into closed state. Thereupon, counter 10 no longer receives any further pulses from signal generator 9. The number of pulses received in counter 10 is a measure of the transit time of the ultrasound in the flow direction of the medium.

With the second timing pulse of master clock 7, the second phase commences. Intermediate switch 14 and two-position switch 15 are switched into their positions shown in broken lines. Thereupon, the signals of signal generator 13 pass to ultrasonic transducer 4, are transmitted in the counterflow direction of medium 6 through measuring section 1 to ultrasonic transducer 5 and delivered, as re-transformed electric signals, to input gate 8 which is thereby closed. In the meantime, counter 10 counts the pulse coming from signal generator 9. This time, the counted pulses are a measure for the transit time of the ultrasound in the counterflow direction of medium 6.

With a pulse interval $v$, the number of pulses $n$ counted in counter 10 gives the time for the respective phase as $$T_{1,2} = n_{1,2} \cdot v$$

This time is summed up and the value is transmitted to a reciprocal unit 16 to be transformed in the reciprocal value $1/T_1$ or $1/T_2$ and passed, through the correspondingly channeled switch 15, to the respective one of two storages 17 and 18. After each cycle, comprising the two phases, is terminated, the difference $1/T_1 - 1/T_2$ is formed in a substraction stage 19 following storages 17 and 18.

since $T_1 = \dfrac{s}{c_0 + v}$ and $T_2 = \dfrac{s}{c_0 - v}$, the difference $$1/T_1 - 1/T_2 = \frac{2v}{s}$$

where $c_o$ is the sound velocity in the medium at rest and $v$ is the flow velocity of the medium.

Thereby, with the known values $1/T_1 - 1/T_2$ and $s$, the flow velocity $v$ of the flowing medium 6 is determined.

Figure 2:
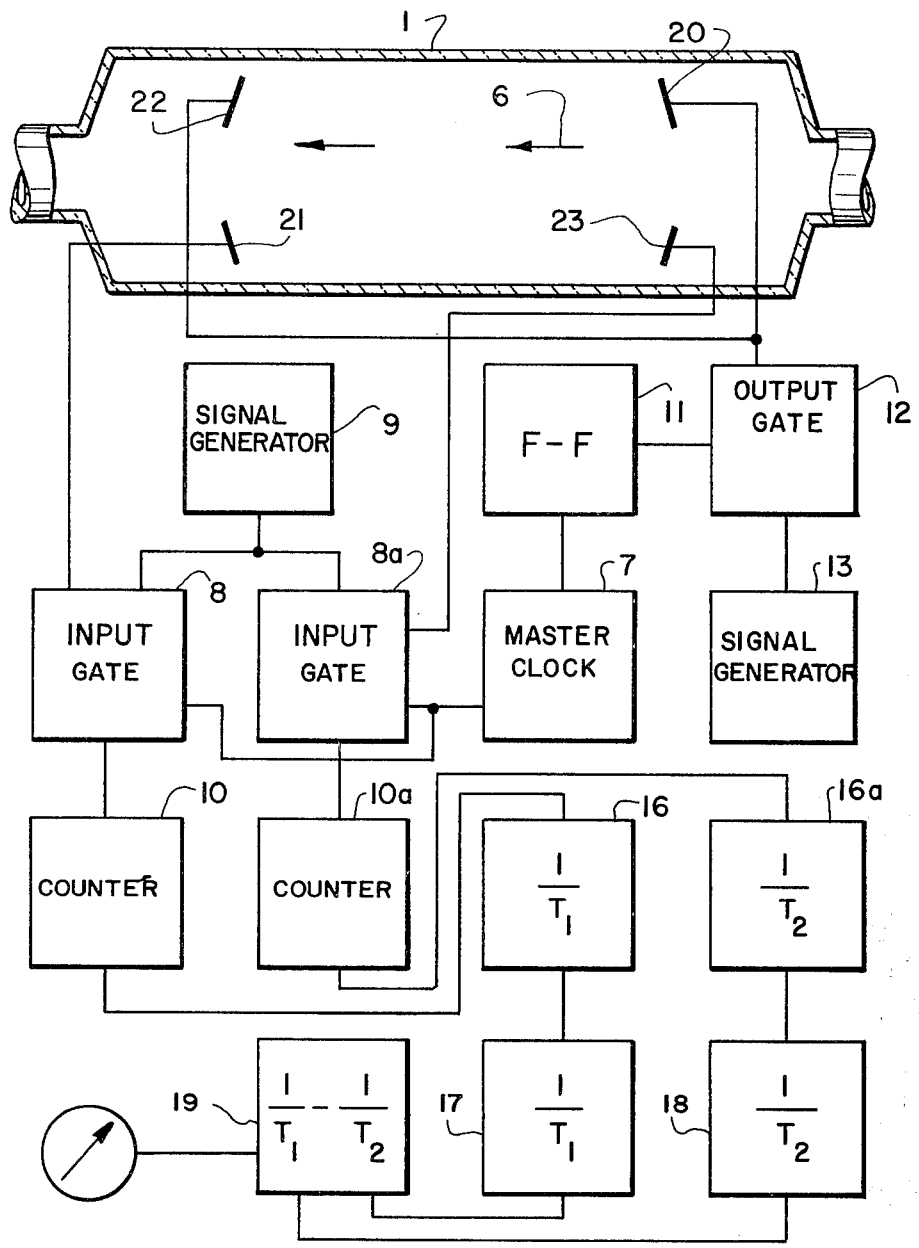
FIG. 2 is a schematic block diagram of another embodiment of the arrangement for measuring flow velocities in accordance with the invention, and using two transducers at each end of a measuring section, one comprising an emitter and the other comprising a receiver.

The measuring arrangement according to FIG. 2 comprises two ultrasonic transducers at each end of measuring section 1, of which one operates as emitter 20 or 22 and the other as receiver 21 or 23. The signals of signal generator 13 are directed to emitters 20 and 22. Then the signals received by receivers 21 and 23 are delivered to input gates 8 and 8a and signals from generator 9 pass through respective counters 10 and 10a and respective reciprocal units 16 and 16a to storages 17 and 18. As in the embodiment according to FIG. 1, the reciprocal values $1/T_1$ and $1/T_2$ which, in this case, are furnished simultaneously, are used for forming the difference in subtraction stage 19 and for determining the flow velocity of flowing medium 6.

Figure 3:
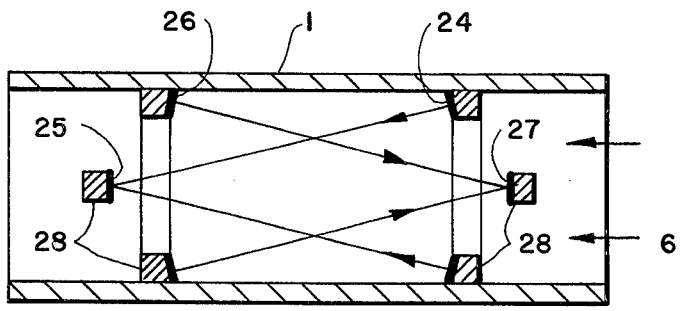
FIG. 3 is an axial sectional view of a measuring section provided in a pipe or conduit and illustrating ring-shaped transducers and point transducers.

Measuring section 1 shown in FIG. 3 is another design of the measuring section illustrated in FIG. 2. Here, the section is limited by ring-shaped transducers 24 and 26 acting as emitters and point transducers 25 and 27 acting as receivers. Transducers 25 and 27 are located at the centers of curvature of concave ring-shaped transducers 24 and 26.

To be able to adjust the length of measuring section 1, which might be changed due to thermal influence, the ultrasonic transducers may be mounted on respective length-compensation supports 28.

As stated, measuring section 1 may be made of a glass ceramic material having a zero temperature coefficient.

While specific embodiments of the invention have been shown and described in detail to illustrate the application of the principles of the invention, it will be understood that the invention may be embodied otherwise without departing from such principles.

What is claimed is:

1. In a method of measuring the flow velocity of media in conduits by means of ultrasound, with the ultrasonic waves being produced by electric signals at one end of a measuring section, transmitted through the measuring section, and retransformed into electric signals at the other end, the improvement comprising determining the transit time $T_1$ of the ultrasound in the flow direction and the transit time $T_2$ of the ultrasound in the opposite direction; digitizing the two transit times $T_1$ and $T_2$; inverting the digitized values into their respective reciprocal values $1/T_1$ and $1/T_2$; establishing the difference $1/T_1 - 1/T_2$ between the two reciprocal values; and determining the flow velocity $v = s/2 \, (1/T_1 - 1/T_2)$ from such difference, where $v$ is the flow velocity of the media and $s$ is the length of the measuring section.

2. In a method of measuring the flow velocity of media in conduits by means of ultrasound, the improvement claimed in claim 1, in which the measurement is effected cyclically with each cycle comprising two phases; the transit time in one direction of the measuring section being measured in a first phase and the transit time in the opposite direction of the measuring section being measured in an immediately following second phase.

3. In a method of measuring the flow velocity of media in conduits by means of ultrasound, the improvement claimed in claim 1, in which the transit times in both opposite directions of the measuring section are measured simultaneously.

4. A device for measuring the flow velocity of media in conduits by means of ultrasound, with ultrasonic waves being produced by electric signals at one end of a measuring section, transmitted through the measuring section, and retransformed into electric signals at the opposite end of the measuring section, said device comprising, in combination, conduit means forming a rectilinear measuring section; respective ultrasonic transducer means at opposite ends of said measuring section, each operable to emit ultrasonic waves for transmittal through the medium to the other ultrasonic transducer means and each operable to receive ultrasonic waves transmitted through the medium from the transducer means; a master clock providing timing pulses; an output gate connected to said transducer means; a monostable flip-flop connecting said master clock to said output gate; a first signal generator connected to said output gate and producing electric signals for the ultrasonic transducer means acting in the emitter mode for transformation into ultrasonic pulses transmitted through the medium to the ultrasonic transducer means operating in the receiver mode for retransformation into electric signals; said output gate assuming the open state for certain periods of time under the control of said master clock through said monostable flip-flop; an input gate connected said transducer means and to said master clock; counter means connected to said input gate; a second signal generator connected to said input gate and producing electric signals for transmission to said counter means through said input gate; said counter means digitizing the pulses delivered through said input gate from said second signal generator; said input gate being placed in the open state by said master clock simultaneously with enabling of said output gate by said master clock through said monostable flip-flop, to permit delivery of pulses from said second signal generator to said counting means; said input gate being placed into the closed state by signals received from the ultrasonic transducer means operating in the receiver mode to interrupt delivery of pulses from said second signal generator to said counter means; reciprocal deriving means connected to said counter means and operable to derive the reciprocals of the counted pulses; and a substraction stage connected to said reciprocal deriving means and operable to derive the difference between the reciprocal of the transit time in the flow direction of the media and the reciprocal of the transit time in the opposite direction through the media, to determine the flow velocity of the media.

5. A device for measuring the flow velocity of media in conduits, as claimed in claim 4, in which said ultrasonic transducer means comprises a first ultrasonic transducer at one end of said measuring section and a second ultrasonic transducer at the opposite end of said measuring section, said first and second ultrasonic transducers operating alternately in the emitter mode and in the receiver mode; an intermediate switch controlled by said master clock and having a first position connecting said input gate to said first ultrasonic transducer operating in the receiver mode and said output gate to said second ultrasonic transducer operating in the emitter mode; said counter means comprising a counter connected to the output of said input gate and said reciprocal deriving means comprising a reciprocal unit connected to said counter; first and second storages connected to said subtraction stage; and a two-position switch controlled by said master clock and having a first position connecting said reciprocal unit to said second storage; a first timing pulse from said master clock enabling said input gate, controlling said intermediate switch to its first position and controlling said two-position switch to its first position, as well as enabling said output gate through said monostable flip-flop; a second timing pulse from said master clock reversing the positions of said intermediate switch and said two-position switch so that said first ultrasonic transducer is connected to said output gate to act in the emitter mode and said second electronic transducer is connected to said input gate to act in the receiver mode.

6. A device for measuring the flow velocity of media in conduits, as claimed in claim 5, in which said first and second ultrasonic tranducers have concave surfaces and are located in mutual confocal relationship at the ends of said measuring section.

7. A device for measuring the flow velocity of media in conduits, as claimed in claim 4, in which said ultrasonic transducer means comprises two ultrasonic transducers at each end of said measuring section, one acting in the emitter mode and the other acting in the receiver mode; an additional input gate connected, in parallel with said first-mentioned input gate, to said second signal generator, said first-mentioned input gate being connected to that ultrasonic transducer at one end of the measuring section acting in the receiver mode and said additional input gate being connected to that ultrasonic transducer at the opposite end of the measuring path acting in the receiver mode; said output gate being connected in parallel to those ultrasonic transducers at the opposite ends of said measuring path acting in the emitter mode; said counter means comprising respective counters connected to the outputs of said first-mentioned input gate and said additional input gate; said reciprocal deriving means comprising respective reciprocal units connected to said counters and operable to invert the counted values thereof; said storage means comprising two storages each connected to a respective reciprocal unit and in parallel to said substraction stage.

8. A device for measuring the flow velocity of media in conduits, as claimed in claim 7, in which the two ultrasonic transducers at each end of said measuring path are constituted by a concave ring ultrasonic transducer and a point transducer; each point transducer being located at the focal point of the concave ring-shaped transducer at the opposite end of said measuring path.

9. A device for measuring the flow velocity of media in conduits, as claimed in claim 7, in which said ultrasonic transducers at opposite ends of said measuring section comprise ring -shaped transducers.

10. A device for measuring the flow velocity of media in conduits, as claimed in claim 7, including respective measuring section length compensation devices supporting each ultrasonic transducer.

11. A device for measuring the flow velocity of media in conduits, as claimed in claim 4, in which said conduit means forming a rectilinear measuring section is formed of a glass ceramic material having a zero temperature coefficient.

* * * * *